United States Patent
Jung et al.

(10) Patent No.: US 9,572,061 B2
(45) Date of Patent: *Feb. 14, 2017

(54) METHOD OF REPORTING AN AGGREGATED MEASUREMENT IN WIRELESS COMMUNICATION SYSTEM

(71) Applicant: LG ELECTRONICS INC., Seoul (KR)

(72) Inventors: Sung-Hoon Jung, Anyang-si (KR); Sung-Duck Chun, Anyang-si (KR); Seung-June Yi, Anyang-si (KR); Young-Dae Lee, Anyang-si (KR); Sung-Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/461,009

(22) Filed: Aug. 15, 2014

(65) Prior Publication Data

US 2014/0357197 A1 Dec. 4, 2014

Related U.S. Application Data

(63) Continuation of application No. 12/695,801, filed on Jan. 28, 2010, now Pat. No. 8,838,091.

(60) Provisional application No. 61/148,370, filed on Jan. 29, 2009.

(30) Foreign Application Priority Data

Jan. 27, 2010 (KR) .......................... 10-2010-0007582

(51) Int. Cl.
*H04W 24/00* (2009.01)
*H04W 24/10* (2009.01)
*H04W 24/02* (2009.01)
*H04W 24/08* (2009.01)

(52) U.S. Cl.
CPC ............. *H04W 24/10* (2013.01); *H04W 24/02* (2013.01); *H04W 24/08* (2013.01)

(58) Field of Classification Search
CPC ...... H04W 24/08; H04W 24/10; H04W 24/02; H04W 16/18; H04W 28/06; H04W 24/00
See application file for complete search history.

(56) References Cited

U.S. PATENT DOCUMENTS

| 5,487,174 A | 1/1996 | Persson |
| 6,445,917 B1 * | 9/2002 | Bark et al. .................... 455/423 |
| 2004/0100941 A1 | 5/2004 | Lim et al. |
| 2004/0176040 A1 * | 9/2004 | Thornton et al. .......... 455/67.11 |
| 2004/0219926 A1 | 11/2004 | Kim et al. |
| 2008/0062913 A1 * | 3/2008 | Zander et al. ................ 370/320 |

(Continued)

FOREIGN PATENT DOCUMENTS

| CN | 1426184 A | 6/2003 |
| EP | 1 881 720 A1 | 1/2008 |

(Continued)

*Primary Examiner* — Olumide T Ajibade Akonai
(74) *Attorney, Agent, or Firm* — Dentons US LLP

(57) ABSTRACT

Disclosed is the radio (wireless) communication system providing a radio communication service and the terminal, and more particularly, to a method of transmitting an aggregated measurement report to a network in an Evolved Universal Mobile Telecommunications System (E-UMTS) evolved from the Universal Mobile Telecommunications System (UMTS) or a Long Term Evolution (LTE) system.

18 Claims, 13 Drawing Sheets

(56) References Cited

U.S. PATENT DOCUMENTS

2010/0167713 A1* 7/2010 Hoffman ................. 455/418

FOREIGN PATENT DOCUMENTS

| EP | 1881720 A1 | 1/2008 |
|----|---|---|
| JP | 07-184254 | 7/1995 |
| JP | 2008-172380 A | 7/2008 |
| KR | 10-2002-0004645 | 1/2002 |
| KR | 10-2003-0056264 | 6/2003 |
| WO | 2006095387 | 9/2006 |
| WO | 2007091795 | 8/2007 |

* cited by examiner

METHOD OF REPORTING AN AGGREGATED MEASUREMENT IN WIRELESS COMMUNICATION SYSTEM

RELATED APPLICATION

The present application is a continuation of U.S. application Ser. No. 12/695,801 filed Jan. 28, 2010, which relates to, and claims priority from, U.S. Provisional Application No. 61/148,370, filed on Jan. 29, 2009, and Korean Application No. 10-2010-0007582 filed on Jan. 27, 2010 in the Republic of Korea, each of which is hereby expressly incorporated by reference herein in its entirety.

TECHNICAL FIELD

The present invention relates to a radio (wireless) communication system providing a radio communication service and a terminal, and more particularly, to a method of transmitting an aggregated measurement report by collecting those measurement reports, which were not transmitted to a network due to a channel situation, in an Evolved Universal Mobile Telecommunications System (E-UMTS) or a Long Term Evolution (LTE) system.

BACKGROUND ART

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Term Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an S1 interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Interconnection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The first layer as a physical layer provides an information transfer service to an upper layer using a physical channel. The physical layer is connected to its upper layer, called a Medium Access Control (MAC) layer, via a transport channel, and data is transferred between the MAC layer and the physical layer via the transport channel. Furthermore, data is transferred via a physical channel between different physical layers, in other words, between the physical layer of a transmitting side and the physical layer of a receiving side. The physical channel is modulated by an Orthogonal Frequency Division Multiplexing (OFDM) scheme and time and frequency are used as radio resources for the channel.

The Medium Access Control (hereinafter, referred to as "MAC") layer located at the second layer provides a service to its upper layer, called a Radio Link Control (hereinafter, referred to as "RLC") layer, via a logical channel. The RLC layer of the second layer supports reliable data transmissions. The function of the RLC layer may be implemented as a functional block in the MAC layer. In this case, the RLC layer may not exist. A Packet Data Convergence Protocol (PDCP) layer of the second layer is used to efficiently transmit IP packets, such as IPv4 or IPv6, in the radio section having a relatively small bandwidth. For this purpose, the PDCP layer performs a header compression function for reducing the size of an IP packet header, which is relatively large in size and includes unnecessary control information.

A Radio Resource Control (hereinafter, referred to as "RRC") layer located at the uppermost portion of the third layer is only defined in the control plane. The RRC layer takes charge of controlling logical channels, transport channels and physical channels in relation to the configuration, re-configuration and release of Radio Bearers (RBs). Here, the RB denotes a service provided by the second layer to perform a data transmission between the UE and the UTRAN. If an RRC connection is established between a RRC layer of the UE and a RRC layer of the UTRAN, then the UE is in an RRC_CONNECTED state. Otherwise, the UE is in an RRC_IDLE state.

Downlink transport channels for transmitting data from a network to UE may include a Broadcast Channel (BCH) for transmitting system information, and a downlink Shared Channel (SCH) for transmitting other user traffic or control messages. In case of traffic or control messages of a downlink multicast or broadcast service, they may be transmitted either via a downlink SCH, or via a separate downlink Multicast Channel (MCH). On the other hand, uplink transport channels for transmitting data from UE to a network may include a Random Access Channel (RACH) for transmitting an initial control message and an uplink Shared Channel (SCH) for transmitting user traffic or control messages.

Logical channels which are located at an upper level of transport channels and mapped to the transport channels may include a Broadcast Control Channel (BCCH), a Paging Control Channel (PCCH), a Common Control Channel (CCCH), a Multicast Control Channel (MCCH), a Multicast Traffic Channel (MTCH), and the like.

A physical channel includes multiple sub-frames arranged on a time axis and multiple sub-carriers arranged on a frequency axis. Here, a sub-frame includes a plurality of symbols on the time axis. A sub-frame includes a plurality of resource blocks each including a plurality of symbols and a plurality of sub-carriers. Also, each sub-frame can use particular sub-carriers of particular symbols (e.g., a first symbol) in the relevant sub-frame for a Physical Downlink Control Channel (PDCCH), that is, a L1/L2 control channel. A sub-frame has time duration of 0.5 ms. A Transmission Time Interval (TTI) as a unit time for transmitting data is 1 ms, corresponding to two sub-frames.

Hereinafter, an RRC state and an RRC connection method of UE will be described in detail. The RRC state refers to whether or not the RRC of the UE is logically connected to the RRC of an E-UTRAN. If connected, then it is called an RRC_CONNECTED state, and otherwise it is called an TTC_IDLE state. For the UE in an RRC_CONNECTED state, the E-UTRAN can recognize the existence of the relevant UE in a cell unit because there exists an RRC connection thereof, and thus the E-UTRAN can effectively control the UE. On the contrary, for the UE in RRC_IDLE state, the E-UTRAN cannot recognize the relevant UE, and therefore, it is managed by a core network in a tracking area unit, which is a unit larger than a cell. In other words, the existence of the UE in an RRC_IDLE state is only recognized in a large area unit, and therefore, it should be changed to an RRC_CONNECTED state in order to receive typical mobile communication services such as voice or data.

When the UE is initially turned on by a user, the UE first searches for a suitable cell and then is camped in an RRC_IDLE state in the relevant cell. The UE camped in an RRC_IDLE state makes an RRC connection with the RRC of the E-UTRAN through an RRC connection procedure when it is required to make an RRC connection, thereby changing the state to an RRC_CONNECTED state. There are several cases when the UE in an idle state is required to make an RRC connection. For example, an uplink data transmission may be required due to a phone call attempt by the user, or the like, or the transmission of a response message may be required in response to a paging message received from the E-UTRAN.

The Non-Access Stratum (NAS) layer located at an upper level of the RRC performs a function such as session management, mobility management, and the like.

In order to manage the mobility of the UE at the NAS layer, both an EPS Mobility Management-REGISTERED (EMM-REGISTERED) state and an EMM-DEREGISTERED state are defined, and both states will be applied to the UE and a Mobility Management Entity (MME). The UE is initially in an EMM-DEREGISTERED state, and carries out a process of registering it into the relevant network through an 'Initial Attach' procedure in order to access a network. If this 'Attach' procedure has been successfully carried out, then the UE and the MME will be in an EMM-REGISTERED state.

In order to manage a signaling connection between the UE and the EPC, both an EPS Connection Management (ECM)-IDLE state and an ECM-CONNECTED state are defined, and the both states will be applied to the UE and the MME. If the UE in an ECM-IDLE state makes an RRC connection with E-UTRAN, then it will be in an ECM-CONNECTED state. If the MME in an ECM-IDLE state makes an S1 connection with E-UTRAN, then it will be in an ECM-CONNECTED state. When the UE is in an ECM-IDLE state, the E-UTRAN has no context information of the UE. Therefore, the UE in an ECM-IDLE state carries out a UE-based mobility procedure such as a cell selection or reselection without receiving a command from the network. On the contrary, when the UE is in an ECM-CONNECTED state, the mobility of the UE is managed by a command of the network. If the location of the UE in an ECM-IDLE state is changed from the location that has been recognized by the network, the UE performs a Tracking Area Update procedure to notify the network of the relevant location of the UE.

Next, system information will be described. The system information includes essential information for the UE to know in order to access a base station. Therefore, the UE should have received all of the system information prior to accessing the base station, and also should have the latest system information all the time. Furthermore, the base station periodically transmits the system information because the system information should be notified to every UE in a cell.

The system information can be divided into MIB, SB, a plurality of SIB, and the like. The Master Information Block (MIB) allows the UE to be notified of a physical architecture of the relevant cell, for example, a bandwidth, and the like. The Scheduling Block (SB) notifies of the transmission information of SIBs, for example, transmission period, and the like. The System Information Block (SIB) is a set of mutually-related system information. For example, a certain SIB includes only the information of neighboring cells, and another certain SIB includes only the information of uplink radio channels used by the UE.

In the related art, a terminal (or UE) generally reports a measurement result to a network (base station) if a condition (or event) for a measurement result report is satisfied or if an expiration of a periodical report timer is happened. However, due to a management of terminal's power or other various reasons, the measurement result can not be reported to the network even if such condition is satisfied or if the periodical report timer is expired. In this case, the network can not achieve its optimization because the network could not obtain the measurement result from the terminal. Therefore, a degraded service quality within a corresponding cell may be caused. To avoid this, if the terminal frequently reports the measurement result to the network without consideration of terminal's current status, a life of terminal's battery will be shorten due to an ineffective power management.

DISCLOSURE OF THE INVENTION

Therefore, an advantage of the present invention is an effective transmission of a measurement report from a terminal to a network in a wireless communication system.

To achieve this and other advantages and in accordance with the purpose of the present invention, as embodied and broadly described herein, there is provided a method of performing a measurement report in wireless communication system, the method comprising: receiving, from a network, a parameter indicating a measurement report configuration; measuring a radio environment after receiving the parameter, wherein the measured radio environment is not yet reported to the network; storing the radio environment measurement; repeatedly performing the steps of measuring and storing until a certain condition is met; aggregating at least two or more stored radio environment measurements; and reporting the aggregated radio environment measurements to the network.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODES FOR CARRYING OUT THE PREFERRED EMBODIMENTS

One aspect of this disclosure relates to the recognition by the present inventors about the problems of the related art as described above, and further explained hereafter. Based upon this recognition, the features of this disclosure have been developed.

Although this disclosure is shown to be implemented in a mobile communication system, such as a UMTS developed under 3GPP specifications, this disclosure may also be applied to other communication systems operating in conformity with different standards and specifications.

Hereinafter, description of structures and operations of the preferred embodiments according to the present invention will be given with reference to the accompanying drawings.

According to the present invention, if a reporting of measurement results is suppressed or not permitted for a certain time period, rather than discarding those measurement results, a terminal may store those suppressed measurement results, and may report those suppressed measurement results by aggregating them during a time period for which measure report is allowed.

Figure 1:
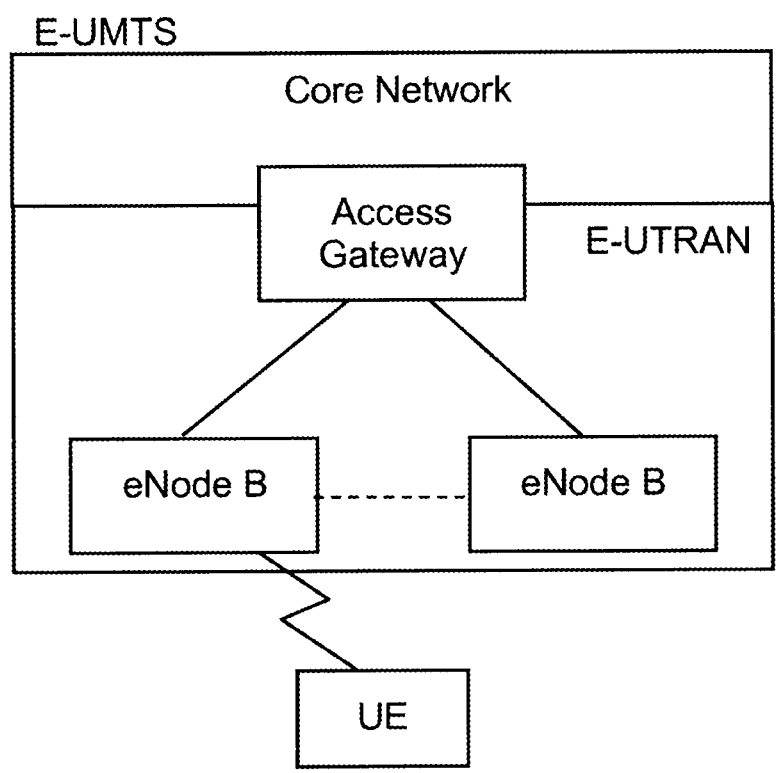
FIG. 1 shows an exemplary network structure of an Evolved Universal Mobile Telecommunications System (E-UMTS) as a mobile communication system to which a related art and the present invention are applied.
Figure 2:
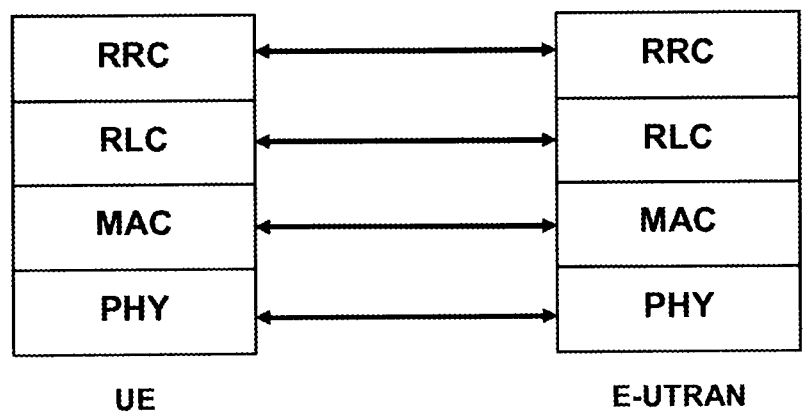
FIG. 2 shows an exemplary view of related art control plane architecture of a radio interface protocol between a terminal and an E-UTRAN.
Figure 3:
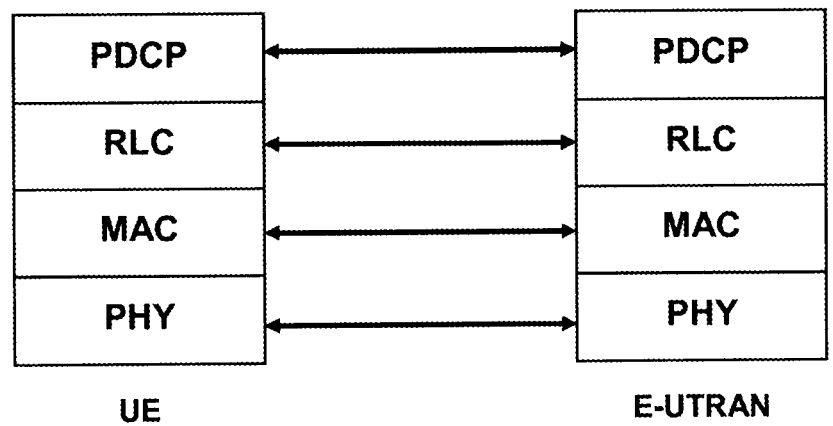
FIG. 3 shows an exemplary view of related art user plane architecture of a radio interface protocol between a terminal and an E-UTRAN.
Figure 4:
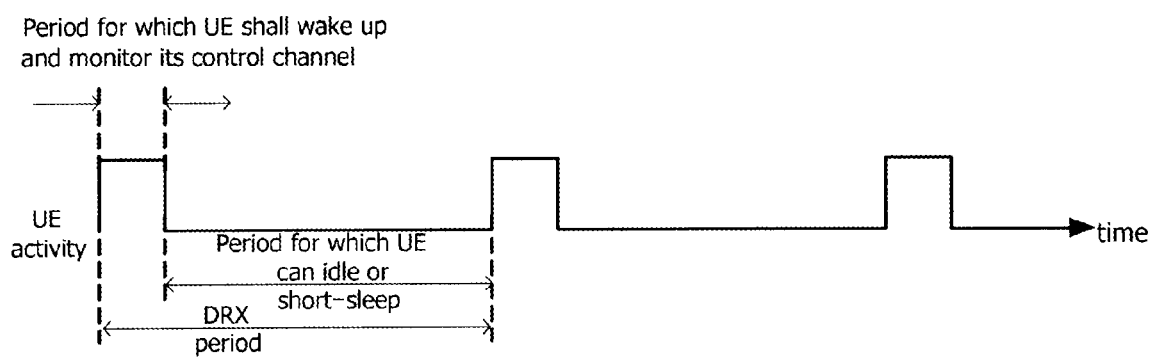
FIG. 4 is an exemplary view illustrating a DRX (Discontinuous Reception) operation for managing a power of terminal.

FIG. 4 is an exemplary view illustrating a DRX (Discontinuous Reception) operation for managing a power of terminal.

In general, in order to effectively utilize a power of terminal (UE), a network (base station) may assign a specific time period for which UE can be an idle or a short-sleep. As such, the terminal may only need to be wake up at a certain time, which is a different time period other than the above assigned time period, and may monitor a control channel of a serving cell to check whether there is any data need to be received. Since the terminal does not perform the monitoring for the control channel during the above assigned time period, a power consumption of the terminal can be minimized. Here, the above procedure may be called as a DRX (Discontinuous Reception). In general, as shown in FIG. 4, a DRX period and a length of active period can be set by the network.

In general, a mobility support for the terminal is a necessity factor in wireless communication system. In order to support the mobility of the terminal, the terminal may continuously measure a quality of serving cell providing a current service. The terminal may also measure a quality of neighboring cell. Then, the terminal may transmit the measurement result to a network in a appreciate time period, and the network may provide an optimized mobility for the terminal based on the received measurement result. Here, information related to the optimized mobility for the terminal can be transmitted to the terminal through a handover command.

In addition to support the mobility of the terminal, a special measurement procedure may be set to be performed by a terminal such that a network service provider can obtain any beneficial information for a network operation. For example, the terminal may receive broadcast information of a particular cell assigned by the network, and then the terminal may check identity information (e.g., Global Cell Identity; GCI) of the cell, position identity information (e.g., Tracking Area Code) of the cell, and/other cell information (e.g., member or non-member of CSG (Closed Subscriber Group) cell). Thereafter, the terminal may report this information to a serving cell. Or, during a movement of the terminal, if service qualities of certain cells are measured as very bad, area information and measurement results for those bad cells may be transmitted to the network for its optimization.

In general, if a frequency reuse factor is 1 in wireless communication system, a terminal is moved between different cells within same frequency. Therefore, in order to support a mobility of the terminal, the terminal has to easily find those cells using same center frequency that of the serving cell. Further, the terminal has to well measure a quality and cell information for those cells. A measurement for a cell using a center frequency that is equal to the center frequency of the serving cell may be called as an intra-frequency measurement. In some case, the terminal may perform this intra-frequency measurement, and may repot the intra-frequency measurement result to the network.

The mobile communication provider may utilize a network by using different frequencies. In case that a mobile communication service is provided using the different frequencies, in order to guarantee a mobility of the terminal, cells in different frequency should be also detected by the terminal. Further, the terminal may also need to measure a quality and cell information for those cells in different frequency. A measurement for a cell using a center frequency that is different from the center frequency of the serving cell may be called as inter-frequency measurement. In some case, the terminal may perform this inter-frequency measurement, and may repot the inter-frequency measurement result to the network.

Further, if the terminal supports a measurement for a mobile communication network, a measurement for a cell of the mobile communication network may be performed by a base station's setting. This measurement for the mobile communication network may be called as inter-RAT measurement.

Figure 5:
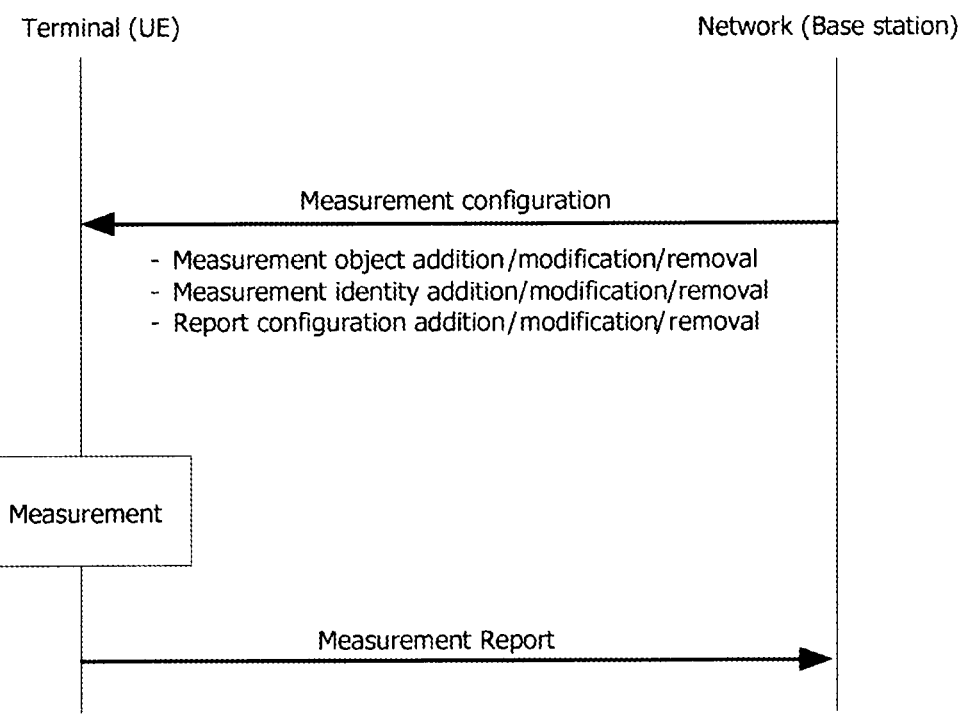
FIG. 5 is an exemplary view illustrating a measurement report procedure.

FIG. 5 is an exemplary view illustrating a measurement report procedure.

As illustrated in FIG. 5, the terminal may determine a measurement object according to a measurement configuration set by a base station, and then may report a measurement result to the base station. Thus, if the terminal receives a measurement configuration message (or any message that corresponds to the measurement configuration message), the terminal may perform the measurement based on the measurement configuration message. Thereafter, if a measurement result satisfies a measurement result report condition included in the measurement configuration message, the terminal may transmit the measurement result via a measurement report (MR) (or any message that corresponds to the MR). Here, the measurement configuration may include following parameters.

Measurement object: parameter indicating what object should be measured by the terminal. Usually, the measurement object that should be measured by the terminal is one of an intra-frequency measurement object, an inter-frequency measurement object, and an inter-RAT measurement object.

Reporting configuration: parameter indicating a measurement result reporting format and a time (or condition, case) for a transmission of the measurement result report message (i.e., report trigger time, report trigger condition, report trigger cases, etc).

Measurement identity: parameter indicating a type of reporting format and a time to report the measurement result report message with respect to which measurement object. The measurement identities connect the measurement object and the reporting configuration. The measurement identity may be included in the measurement result report message such that a measurement object and a type or time of report trigger can be identified by the measurement result report message itself.

Quantity configuration: parameter indicating a measurement unit, report unit setting, or a filter value for filtering of the measurement result value, etc.

Measurement gap: parameter indicating a time only used for measurement. This measurement gap is created because scheduling for a downlink transmission or an uplink transmission is not established. During this time, there is no data transmission between the terminal and serving cell.

In order to perform the measurement procedure explained above, the terminal may have a measurement object list, measurement reporting configuration list, and a measurement identity list. In general, E-UTRAN base station may configure only one measurement object to the terminal for a single frequency.

Figure 6:
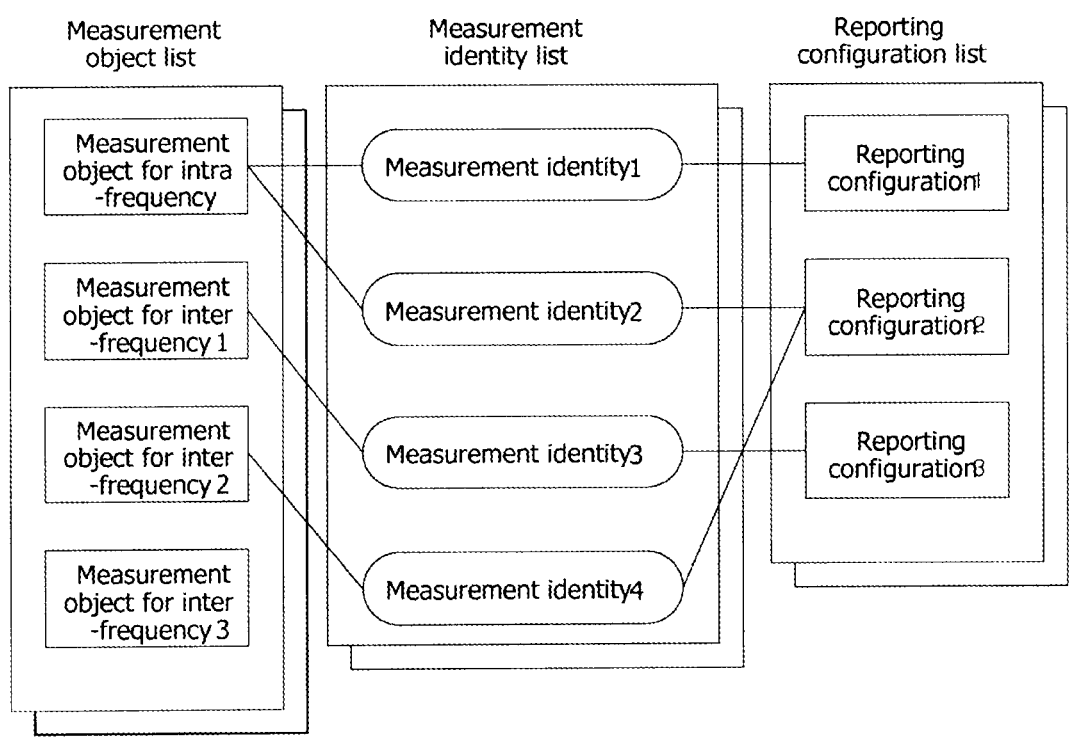
FIG. 6 is an exemplary view for a measurement configuration used in the measurement report procedure.

FIG. 6 is an exemplary view for a measurement configuration used in the measurement report procedure.

As shown in FIG. 6, a measurement identity 1 connects a measurement object for intra-frequency with a reporting configuration 1. Accordingly, the terminal may perform a measurement for intra-frequency, and the reporting configuration 1 is used to determine a measurement result report format and a time/condition for the measurement result report.

Just like the measurement identity 1, a measurement identity 2 is connected with the measurement object for intra-frequency. However, unlike the measurement identity 1, a reporting configuration 2 is connected with the measurement identity 2. Accordingly, the terminal may perform the measurement for intra-frequency, and the reporting configuration 2 is used to determine a measurement result report format and a time/condition for the measurement result report. Since the reporting configuration 1 and reporting configuration 2 are respectively connected to the measurement object for intra-frequency via the measurement identity 1 and 2, if a measurement result for the intra-frequency measurement object satisfies any one of the reporting configuration 1 and the reporting configuration 2, the terminal can report the measurement result for the intra-frequency to a network.

A measurement identity 3 connects a measurement object for inter-frequency 1 and a reporting configuration 3. Accordingly, if a measurement result for the inter-frequency 1 satisfies a result report condition (or requirement) included in the reporting configuration 3, the terminal can report the measurement result for the inter-frequency 1 to the network.

A measurement identity 4 connects a measurement object for inter-frequency 2 and a reporting configuration 2. Accordingly, if a measurement result for the inter-frequency 2 satisfies a result report condition (or requirement) included in the reporting configuration 2, the terminal can report the measurement result for the inter-frequency 2 to the network.

Here, the addition/modification/removal of the measurement object may be made by a network (base station). Furthermore, the addition/modification/removal of the measurement identity may be made by the network. Also, the addition/modification/removal of the measurement report configuration may be made by the network.

Figure 7:
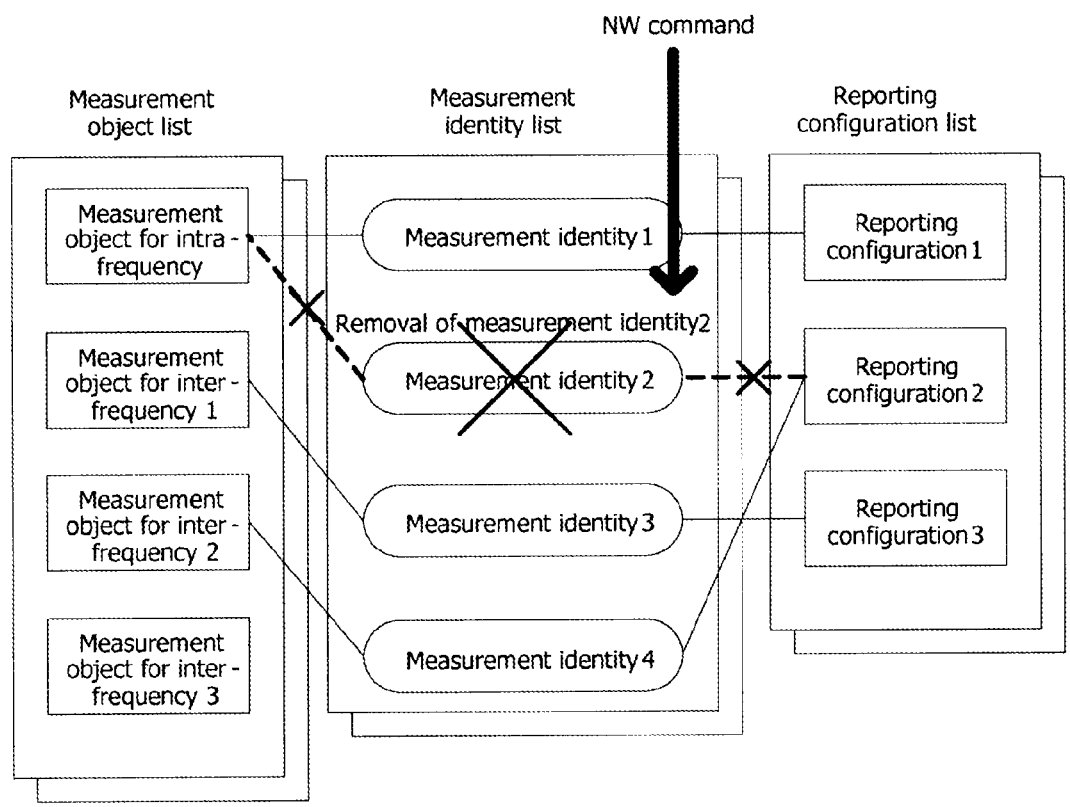
FIG. 7 is an exemplary view of an operation of deleting a measurement identity in the measurement configuration.

FIG. 7 is an exemplary view of an operation of deleting a measurement identity in the measurement configuration.

As illustrated in FIG. 7, if a network (base station) deletes a specific measurement identity (e.g., measurement identity 2) through a network command, a terminal may stop to perform a measurement associated with the specific measurement identity. Further, any measurement report for a measurement result related to the specific measurement identity may be stopped. Here, although the specific measurement identity has been deleted, associated measurement object and reporting configuration are not removed or not modified.

Figure 8:
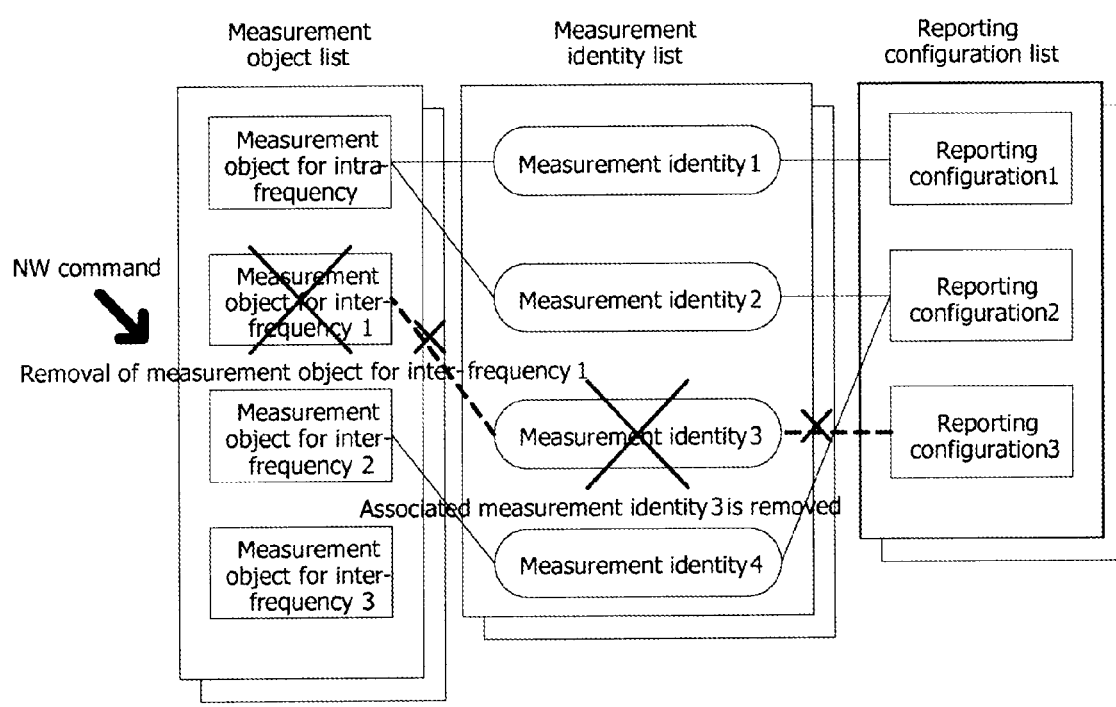
FIG. 8 is an exemplary view of an operation of deleting a measurement object in the measurement configuration.

FIG. 8 is an exemplary view of an operation of deleting a measurement object in the measurement configuration.

As illustrated in FIG. 8, if a network (base station) deletes a specific measurement object (e.g., measurement object for inter-frequency 1) through a network command, a terminal may stop to perform a measurement associated with the specific measurement object. Further, any measurement report for a measurement result related to the specific measurement object may be stopped. Here, although the specific measurement object has been deleted, an associated reporting configuration is not removed or not modified.

Although it is not illustrated by a figure, if a network (base station) deletes a specific measurement report configuration through a network command, a terminal may also delete an associated measurement identity. Further, a terminal may stop to perform a measurement associated with the deleted measurement identity. Further, any measurement report for a measurement result related to the deleted measurement identity may be stopped. Here, although the specific measurement report configuration and the associated measurement identity have been deleted, an associated measurement object is not removed or not modified.

As aforementioned, a terminal is supposed to report a measurement result to a network if a condition or event for a measurement result report is satisfied. However, there is some case that the terminal does not report the measurement result report message to the network due to a terminal's power management.

Figure 9:
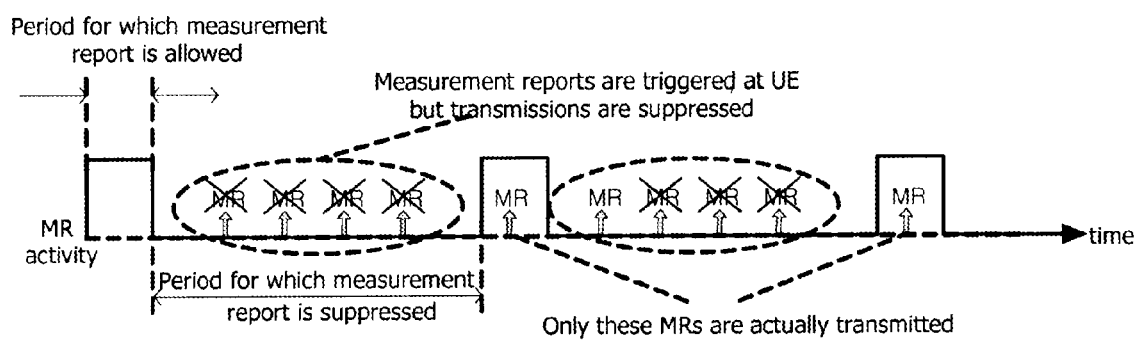
FIG. 9 is an exemplary view illustrating a suppression of terminal's measurement reports.

FIG. 9 is an exemplary view illustrating a suppression of terminal's measurement reports.

For example, when a DRX operation is set for a terminal's power management, the terminal does not report a measurement result in a purpose for the power management, if a situation for the measurement result report is happen during the DRX inactive period. If the DRX inactive period is long or a periodical report timer is set to be short in relative to the DRX inactive period of the terminal, the situation for the measurement result report will be happen very often. Also, if events (or conditions) for a measurement result report are satisfied many times during the DRX inactive period of the terminal, the situation for the measurement result report also will be happen very often. However, as explained above, the terminal does not report the measurement result to a network for its power management purpose. Here, not just for the power management purpose, due to other different reasons, the network may set the terminal to delay the measurement result report. In this case, the terminal also does not report the measurement result(s) even if the measurement result(s) is ready to be reported.

However, even if the DRX operation is set to be performed or a report for the measurement result is suppressed by other settings, in some cases, the measurement result still needs to be reported when the terminal has a measurement result and a condition (or requirement) for the measurement result report is satisfied. The main reason for this is that the measurement result is used to optimize a mobility support of the terminal, a reconfiguration of network's parameters, and/or neighboring cell information (e.g., radio quality, cell identity, etc).

Therefore, according to the present invention, if a report for the measurement result is suppressed for a specific time period, instead of discarding the suppressed measurement report, the terminal may stores those suppressed measurement results, and may report the suppressed measurement results to a network during a time period for which measurement report is allowed. Here, the specific time period that the report for the measurement result is suppressed, may include a DRX inactive period, or a terminal's RRC Idle period, etc. The specific time period may be set as periodically or non-periodically based on a network setting or a measurement situation by the terminal. Further, the above specific time period can be expressed as any time period other than the time period for which measurement report is allowed.

In general, a period for which measurement report is allowed may refer to a DRX active period or a time set by a network for permitting a report of the measurement result. Here, the network may assign a specific time or a specific condition for the measurement result report. The measurement result may include information which can be obtained by receiving a broadcast signal or a reference signal of a neighboring cell, such as radio quality for a cell providing a service, a radio quality for a neighboring cell (e.g., RSRP, RSRQ, EcNO), a cell identity (e.g., Physical Cell Identity (PCI), GCI (Global Cell Identity)), a PLMN list of a cell belonged, a tracking area (TA) of the cell belonged, or a closed subscriber group (CSG) membership information (i.e. member or non-member)).

According to the present invention, if previously suppressed measurement reports are included in the measurement result report message, the measurement result report message may further include specific information to indicate whether the previously suppressed measurement results are included in the measurement result report message. In the present invention, the specific information may be called as an aggregated report indication. Using this aggregated report indication, a network may correctly determine a structure and contents of the received measurement result report message. Here, when the terminal stores (or logging) the suppressed measurement results, the terminal may store only N number of most recently measured results. Here, the N value may be set by the network using a broadcast signaling or a dedicated signaling.

Further, according to the present invention, if necessary, the terminal may further include addition information indicating a structure or content of measurement results, such that many different measurement results can be decoded or determined in separate manner. For example, the terminal may generate a measurement result report message according to an order of the suppressed measurement report, and then include addition information to indicate this. In another example, a time (or place) satisfying a measurement report condition may also be recorded, and then such time (or place) can be reported to a network with the measurement results. Any other various modifications can be also applied to the present invention.

Figure 10:
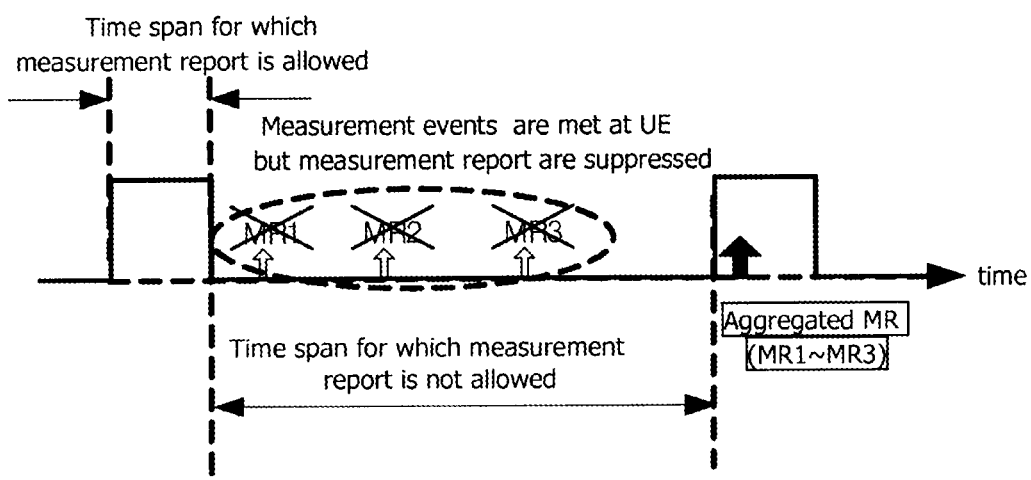
FIG. 10 is a first exemplary embodiment illustrating a transmission of aggregated measurement report according to the present invention.

FIG. 10 is a first exemplary embodiment illustrating a transmission of aggregated measurement report according to the present invention.

As illustrated in FIG. 10, if measurement result reports are suppressed (although measurement events (or conditions) are satisfied at a terminal) during a time period (or time span) for which measurement report is not allowed, the terminal may store (or logging) the measurement reports (MRs). Here, the terminal usually stores the measurement report in sequential order, and the terminal may also store only N number of most recently performed measurement reports. Thereafter, if a time period becomes a time span for which measurement report is allowed, the terminal may transmit an aggregated measurement report message to a network. Here, the aggregated measurement report message is consisted of the previously suppressed measurement reports. Here, the terminal may also transmit information for indicating that the measurement report message includes the previously suppressed measurement reports. Further, if necessary, the terminal may further include addition information indicating a structure or content of measurement results, such that many different measurement results can be decoded or determined in separate manner. Here, the terminal may generate a measurement result report message according to a order of the suppressed measurement report, and then include addition information to indicate such order of the suppressed measurement report. Further, a time (or place) satisfying a measurement report condition may also be recorded, and then this time (or place) can be reported to a network with the measurement results. Here, such time may be indicated or instructed by the network.

Figure 11:
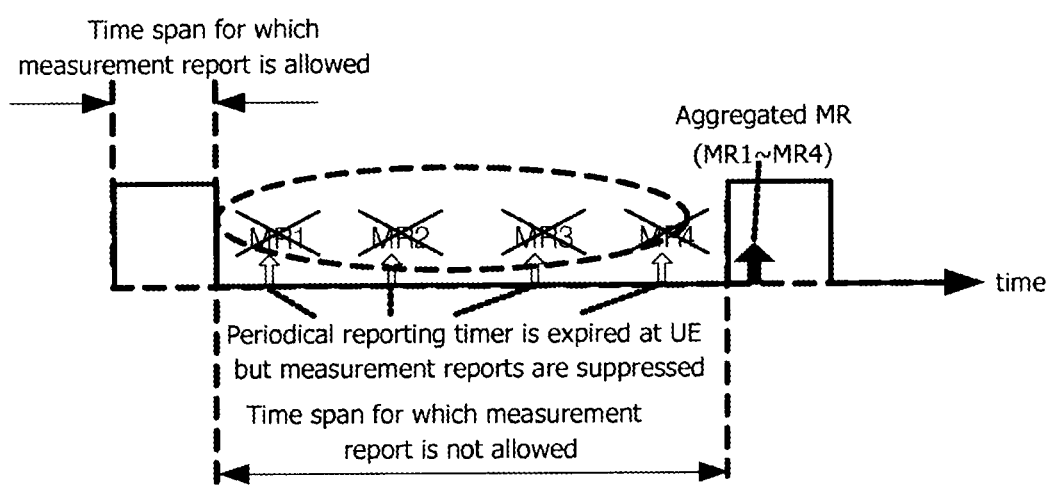
FIG. 11 is a second exemplary embodiment illustrating a transmission of aggregated measurement report according to the present invention.

FIG. 11 is a second exemplary embodiment illustrating a transmission of aggregated measurement report according to the present invention.

As illustrated in FIG. 11, if measurement result reports are suppressed (although a periodical reporting timer is expired at a terminal) during a time period (or time span) for which measurement report is not allowed, the terminal may store (or logging) the measurement reports (MRs). Here, the terminal usually stores the measurement report in sequential order, and the terminal may also store only N number of most recently performed measurement reports. If the periodical reporting timer is expired during a time period for which measurement report is not allowed, the terminal may increment a transmission number counter (although the measurement result is not reported to the network). Thereafter, if a time period becomes a time span for which measurement report is allowed, the terminal may transmit an aggregated measurement report message to a network. Here, if the periodical reporting timer is still running at the time period for which measurement report is allowed, the terminal may transmit the aggregated measurement report message to the network at an expiration of the periodical reporting timer. Further, if the transmission number counter of a corresponding periodic report exceeds a threshold value set by the network, the terminal may transmit the aggregated measurement report to the network as soon as a time period becomes the time span for which measurement report is allowed. As aforementioned, the terminal may transmit information indicating that the suppressed measurement result is included in the transmitted aggregated measurement report. For example, the information may include a transmission number counter that corresponds to each of the transmission of the suppressed measurement reports. Here, although the suppressed measurement reports are not transmitted to the network, this number of the suppressed measurement reports should be also counted. For example, after the terminal report the N number of measurement result, during a certain period, if M number of measurement result report is suppressed, when the aggregated measurement report is transmitted to the network at the time period for which the measurement report is allowed, the total transmission number for the counter may be set as N+M+1. Here, the constant value 1 represents a transmission number for transmission of the aggregated measurement report.

Figure 12:
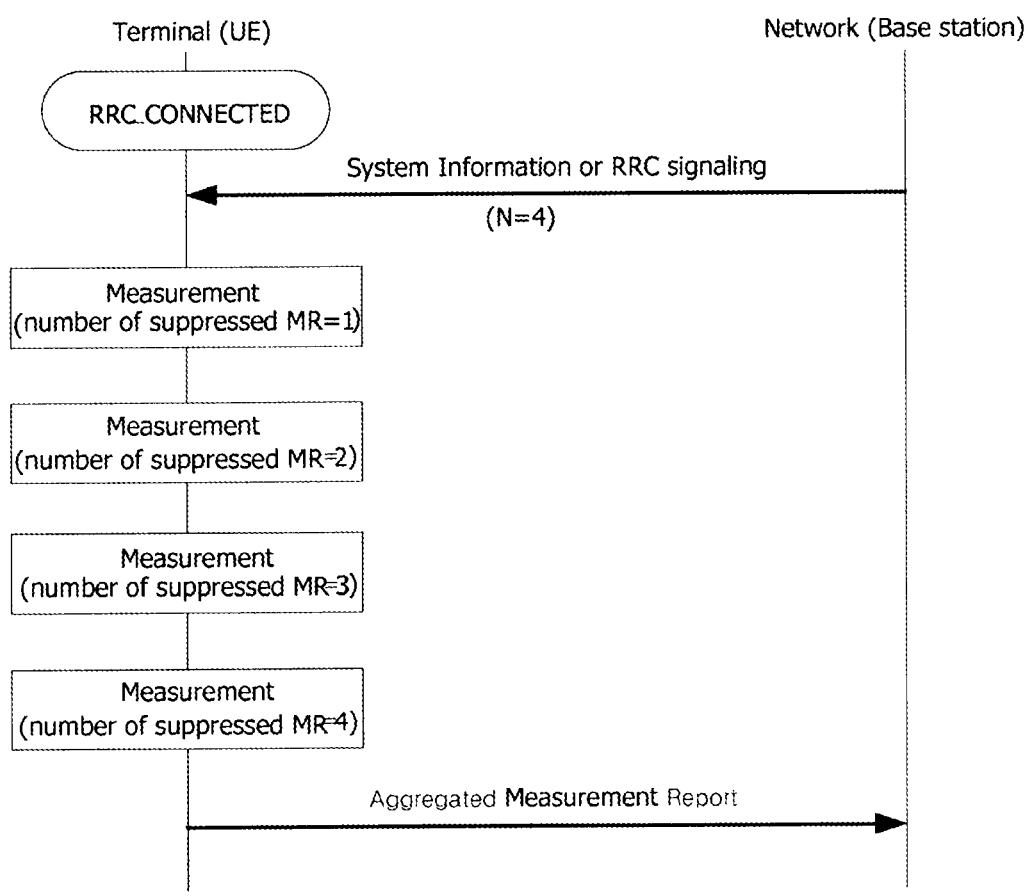
FIG. 12 is a third exemplary embodiment illustrating a transmission of aggregated measurement report according to the present invention.

FIG. 12 is a third exemplary embodiment illustrating a transmission of aggregated measurement report according to the present invention.

As shown in FIG. 12, if a number for suppressed measurement reports reaches a threshold value set by a network, the terminal may transmit an aggregated measurement reports to the network. Here, the aggregated measurement reports are consisted of the previously suppressed measurement reports. Briefly, when the terminal is in RRC connected mode, if the number of the suppressed measurement reports reaches a threshold value (N=4) set by the network, then the terminal may transmit a measurement result message including the all or part of the suppressed measurement reports. More specifically, first, the network (base station) may set N value as 4, and then may transmit this N value to the terminal through a broadcast signaling and/or a dedicate signaling. Thereafter, the terminal may count a number of suppressed measurement reports. If the counted number of suppressed measurement reports is same as the threshold value (N), the terminal may transmit the aggregated measurement report message to the network.

Figure 13:
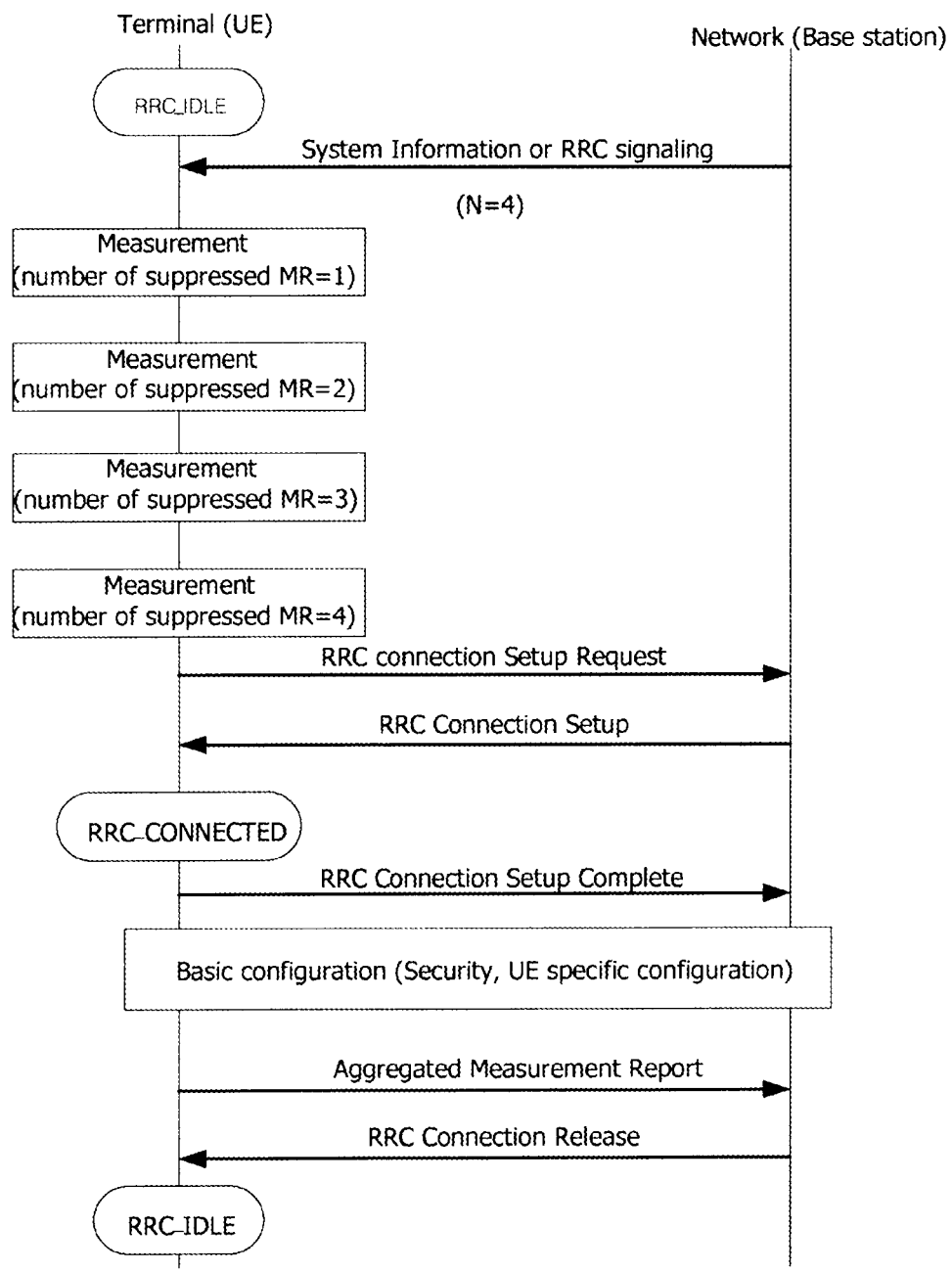
FIG. 13 is a fourth exemplary embodiment illustrating a transmission of aggregated measurement report according to the present invention.

FIG. 13 is a fourth exemplary embodiment illustrating a transmission of aggregated measurement report according to the present invention.

As shown in FIG. 13, if a number of suppressed measurement reports reaches a threshold number (i.e., N=4) set by a network, a terminal may switch its mode from a RRC Idle to a RRC connected, and then may transmit an aggregated measurement report to the network. More specifically, first, the network (base station) may set N value as 4, and then may transmit this N value to the terminal through a broadcast signaling and/or a dedicate signaling. Thereafter, the terminal may perform a measurement procedure in the RRC idle mode. Then, the terminal may count a number of suppressed measurement reports. If the counted number of suppressed measurement reports is equal to the threshold value (N), the terminal may transmit a RRC connection setup request to the network in order to establish the RRC connection. After the RRC connection is established and any necessary configurations (e.g., security) between the terminal and network are completed, the terminal may transmit the aggregated measurement report message to the network.

A study on MDT (Minimization of Drive-Tests) in next generation networks, which a concept of present invention can be applied to, will be explained as followings.

The MDT study aims at assessing the feasibility, benefits and complexity of automating the collection of UE measurements to minimize the need of manual drive-tests. The work under the MDT study should define use cases and requirements for minimizing drive tests in next generation LTE/HSPA networks. Also, based on the defined use cases and requirements, the MDT should focus on study the necessity of defining new UE measurements logging and reporting capabilities for minimizing drive tests and analyze the impact on the UE The use cases for the MDT will be given as following.

1. Radio coverage optimization; that is, information about radio coverage is essential for network planning, network optimization and Radio Resource Management (RRM) parameter optimization (e.g. idle mode mobility parameter setting, common channel parameterization), as well as back-end network management activities, such as network dimensioning, CAPEX/OPEX planning and marketing. Additionally the detection of coverage problems (e.g. coverage holes, pilot pollution, low user throughput, etc.) in specific areas may be performed.

2. Mobility optimization; that is, mobility optimization is an important part of network operation. Information about mobility problems or failures can be used to identify localized lack of coverage or the need to adapt the network parameters setting. (e.g. in order to avoid too early or too late handover and to improve the handover success rate and overall network performance)

3. Network capacity optimization; that is, the operator may need to be able to determine if there is too much/little capacity in certain parts of the network. Such determination may help to determine placement of new cells, to configure common channels and to optimize other capacity related network parameters.

4. Parameterization for common channels; that is, user experience and/or network performance can be degraded by suboptimal configuration of common channels (e.g. random access, paging and broadcast channels). Detecting problems (e.g. on UL or DL common channel coverage) or analyzing the performance (e.g. connection setup delay) for the procedures associated with common channels, may help network parameter setting and configuration change for system performance optimization.

5. Quality of Service verification; that is, one of the objectives of the network performance analysis is the verification of the quality of service (e.g. user throughput). This may also allow detecting critical conditions and determining the need to change the network configuration, parameter settings or capacity extension.

In the following, UE (or terminal) measurement logs for minimizing drive tests will be described. The measurement logs may be taken at the occurrence of predefined "triggers" (e.g. periodic trigger, a failure event). A measurement logging type for supporting the aforementioned MDT use cases will be explained as following.

1. Periodical downlink pilot measurements; that is, radio environment measurements, such as CPICH RSCP, CPICH Ec/No, or TDD P-CCPCH RSCP and ISCP, RSRP and RSRQ (connected mode only) are logged periodically.

2. Serving cell becomes worse than threshold; that is, radio environment measurements, such as CPICH RSCP, CPICH Ec/No, or TDD P-CCPCH RSCP and ISCP, RSRP and RSRQ (connected mode only), are logged when the serving cell metric becomes worse than the configured threshold.

3. Transmit power headroom becomes less than threshold; that is, transmit power headroom and radio environment measurements, such as CPICH RSCP, CPICH Ec/No, or TDD P-CCPCH RSCP and ISCP, RSRP and RSRQ (connected mode only) are logged when UE transmit power headroom becomes less than the configured threshold.

4. Random access failure; that is, details on the random access and radio environment measurements, such as CPICH RSCP, CPICH Ec/No, or TDD P-CCPCH RSCP and ISCP, RSRP, and RSRQ (connected mode only) are logged when a random access failure occurs.

5. Paging channel failure (i.e., PCCH decode error); that is, details of the radio environment, location, time and cell identity are logged at the point when the UE fails to decode the PCCH on the Paging channel for two consecutive times.

6. Broadcast channel failure; that is, details of the radio environment, location, time, cell identity and frequency are logged at the point when the UE fails to read the relevant DL common channels to acquire required system information for camping on a cell.

7. Radio link failure report; that is, radio measurements, such as CPICH RSCP, CPICH Ec/No, or TDD P-CCPCH RSCP and ISCP, RSRP, and RSRQ available at the UE are reported at the RLF occurrence.

A method of enabling/disabling an aggregated reporting functionality by a network will be explained as followings. Specifically, the aggregated reporting associated with aforementioned MDT (Minimization of Driver-Tests) study and the present invention will be triggered in following cases.

1. If a number of collected measurement result is equal to a number designated by the network.

2. Absolute time based; that is, it can be easily envisioned that operators would like to have the UEs upload the collected measurement logs in off peak hours. This is to limit adverse impacts to the network capacity and to utilize spare radio resource that is available in off peak hours. For example, reporting may be triggered at absolute time (e.g. at 3 AM every day).

3. On demand; that is, the operator may want to have full control over when the UE measurement logs are uploaded to the network entity. In this case, the operator may use an on-demand mechanism where the UE is asked to send the collected measurement logs with an explicit signaling.

4. Periodical timer based; that is, some measurements could create measurement logs of a large amount and frequent reporting may be more suitable for them. As such, a reporting trigger based on a periodical timer may enable the trade-off between the reporting frequency and the UE memory requirement.

5. UE memory usage based; that is, the operator would not know how many logs will be taken by the UE, especially for those measurement logs related to particular failure events. UE discarding of measurement logs can be avoided if the operator can configure the reporting triggered when the UE memory is constrained. A threshold with respect to the UE memory usage can be used to trigger a measurement log reporting.

6. UE leaves logging campaign; that is, the UE may be leaving the logging campaign for various reasons (battery power constraints, user preference). When this happens, it would be desirable to take advantage of the collected logs, rather than discarding them. Thusly, a measurement log reporting can be triggered when the UE leaves the logging campaign.

7. Location based; that is, another way of mitigating the capacity impact is to let the UE send a report in an area where the capacity is of less concerns. In an early deployment of LTE, it can be expected that many logs are taken by the UE due to frequent triggers associated with failure events. The operator may want to avoid extensive measurement reporting in metropolitan areas where LTE is deployed and have the UE reporting in suburban areas. The location can be a group of cells or location registration areas.

8. Combined triggers; that is, it should be possible to configure multiple reporting triggers, which results in a combined reporting policy.

According to a present invention, even if a reporting of measurement results is suppressed during a certain time period due to a terminal's power management or other various reasons, a terminal may aggregate (or accumulate) all or part of the suppressed measurement results, and may report the aggregated measurement results to a network when a report for the measurement result is allowed to be transmitted. The network may use this aggregated measurement results for a terminal's mobility support, a reconfiguration for network parameter(s), or an analysis of neighboring cell information (i.e., radio quality, cell identity, etc). For example, if the terminal measures neighboring cell information, such as a cell identity or a service quality for the neighboring cell, during a time period that the report of the measurement results is suppressed, the terminal may aggregate these neighboring cell information, and then may report to the network when the report for the measurement result is allowed. Upon receiving theses neighboring cell information from the terminal, the cell identity of the neighboring cell and/or the service quality of the neighboring can be notified to the network. Thereafter, the network may start its optimization based on this neighboring cell information.

Since so many numbers of terminals are existed in a network, the network may select appropriate or suitable numbers of terminals for necessary measurements. Further, as proposed in present invention, if the measurement results are set to be reported at a less traffic time period (i.e., late night or early morning), radio resource can be effectively utilized as measurement reports for the network optimization are no longer needed to be performed during a heavy traffic time period (i.e., a day time).

The present invention may provide a method of performing a measurement report in wireless communication system, the method comprising: receiving, from a network, a parameter indicating a measurement report configuration; measuring a radio environment after receiving the parameter, wherein the measured radio environment is not yet reported to the network; storing the radio environment measurement; repeatedly performing the steps of measuring and storing until a certain condition is met; aggregating at least two or more stored radio environment measurements; reporting the aggregated radio environment measurements to the network, establishing a RRC (radio resource control) connection with the network after the certain condition is met, wherein a certain number of the most recently measured radio environments are only stored, the certain number is received from the network via a broadcast signaling or a dedicated signaling, the parameter indicating the measurement report configuration is received from the network periodically or non-periodically, the aggregated radio environment measurements are aggregated in a order of measuring time, the radio environment is measured in a RRC_IDLE mode, the received parameter indicates a total number of measurement that should be performed by a terminal, the certain condition is met when a total number of measuring steps performed by the terminal is equal to the total number of measurements indicated in the received parameter, the measured radio environment represents at least one of a radio quality for a cell providing a service, a radio quality for a neighboring cell, a cell identity, closed subscriber group (CSG) membership information, and broadcast information of other cell, the measured radio environment is specific information among broadcast information of a cell, and the specific information is instructed by the network to be read, the radio environment measurements are aggregated with information indicating a time and place for a corresponding measurement, the aggregated radio environment measurement is reported based on a radio environment measurement report condition, and the radio environment measurement report condition is at least one of a network's indicated number, absolute time, a network demand, a periodical timer, a terminal memory usage and a position of terminal.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method of performing a measurement report by a User Equipment (UE) in a wireless communication system, the method comprising:

receiving, from a network, a measurement configuration message;

logging radio environment measurements in a Radio Resource Control (RRC) idle mode;

aggregating plurality of the logged radio environment measurements; and reporting the aggregated radio environment measurements to the network, wherein the logging of the radio environment measurement is performed in accordance with a position of the UE, wherein the plurality of the logged radio environment measurements are aggregated with time information for each corresponding measurement, wherein the time information for each of the corresponding measurements is a time when each corresponding measurement is logged in the RRC idle mode, wherein the aggregated radio environment measurements are reported based on a radio environment measurement report condition, wherein the radio environment measurement report condition is at least a network's indicated number, an absolute time, a network demand, a periodic timer, a UE memory usage or the position of the UE, and wherein the UE logs the radio environment measurements until an amount of logged radio environment measurements exceeds a size of the UE memory.

2. The method of claim 1, wherein only a certain number of the most recently measured radio environments are logged.

3. The method of claim 2, wherein the certain number is received from the network via broadcast signaling or dedicated signaling.

4. The method of claim 1, wherein the measurement configuration message is received from the network periodically or non-periodically.

5. The method of claim 1, wherein the plurality of the logged radio environment measurements are aggregated in order of measuring time.

6. The method of claim 1, wherein the measurement configuration message indicates a total number of measurements that should be performed by the UE.

7. The method of claim 6, wherein the plurality of the radio environment measurements are logged when a total number of measuring steps performed by the UE is equal to the total number of measurements indicated in the received measurement configuration message.

8. The method of claim 7, further comprising: establishing a Radio Resource Control (RRC) connection with the network after the plurality of the radio environment measurements are logged.

9. The method of claim 1, wherein the plurality of the radio environment measurements represent at least one of a radio quality for a current cell providing a service, a radio quality for a neighboring cell, a current cell identity, a neighboring cell identity, closed subscriber group (CSG) membership information, and broadcast information of the current or neighboring cell.

10. A User Equipment (UE) for performing a measurement report in wireless communication system, the UE comprising:
a processor that:
receives a measurement configuration message;
logs radio environment measurements in a Radio Resource Control (RRC) idle mode;
aggregates a plurality of the logged radio environment measurements; and
reports the aggregated radio environment measurements,
wherein the logging of the radio environment measurement is performed in accordance with a position of the UE,
wherein the plurality of the logged radio environment measurements are aggregated with time information for each corresponding measurement,
wherein the time information for each of the corresponding measurements is a time when each corresponding measurement is logged in the RRC idle mode,
wherein the aggregated radio environment measurements are reported based on a radio environment measurement report condition, and
wherein the radio environment measurement report condition is at least a network's indicated number, an absolute time, a network demand, a periodic timer, a UE memory usage or the position of the UE, and
wherein the radio environment measurements are logged until an amount of the logged radio environment measurements exceeds a size of the UE memory.

11. The User Equipment of claim 10, wherein only a certain number of the most recently measured radio environments are logged.

12. The User Equipment of claim 11, wherein the certain number is received via broadcast signaling or dedicated signaling.

13. The User Equipment of claim 10, wherein the measurement configuration message is received periodically or non-periodically.

14. The User Equipment of claim 10, wherein the plurality of the logged radio environment measurements are aggregated in order of measuring time.

15. The User Equipment of claim 10, wherein the measurement configuration message indicates a total number of measurements that should be performed by the UE.

16. The User Equipment of claim 15, wherein the plurality of the radio environment measurements are logged when a total number of measuring steps performed by the UE is equal to the total number of measurements indicated in the received measurement configuration message.

17. The User Equipment of claim 16, wherein the processor establishes a Radio Resource Control (RRC) connection with a network after the plurality of the radio environment measurements are logged.

18. The User Equipment of claim 10, wherein the plurality of the radio environment measurements represent at least one of a radio quality for a current cell providing a service, a radio quality for a neighboring cell, a current cell identity, a neighboring cell identity, closed subscriber group (CSG) membership information, and broadcast information of the current or neighboring cell.

* * * * *